US012606066B2

(12) United States Patent
Salter et al.

(10) Patent No.: US 12,606,066 B2
(45) Date of Patent: Apr. 21, 2026

(54) VEHICLE SEATING SYSTEM HAVING INDUCTIVE POWERED COVER

(71) Applicant: Ford Global Technologies, LLC, Dearborn, MI (US)

(72) Inventors: Stuart C. Salter, White Lake, MI (US); William James Mangan, Ypsilanti, MI (US); Ryan Welch, Ottawa Lake, MI (US); Brendan Diamond, Grosse Pointe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 638 days.

(21) Appl. No.: 18/120,525

(22) Filed: Mar. 13, 2023

(65) Prior Publication Data

US 2024/0313579 A1 Sep. 19, 2024

(51) Int. Cl.
B60N 2/56 (2006.01)
B60N 2/60 (2006.01)

(52) U.S. Cl.
CPC ......... B60N 2/5685 (2013.01); B60N 2/6018 (2013.01)

(58) Field of Classification Search
CPC .. B60N 2/5678; B60N 2/5685; B60N 2/6036; B60N 2/6027; B60N 2/5833; B60N 2/5825; B60N 2210/12; B60N 2/6018
See application file for complete search history.

(56) References Cited

U.S. PATENT DOCUMENTS

| | | | |
|---|---|---|---|
| 10,661,689 B2 | 5/2020 | Ponich | |
| 10,992,187 B2 | 4/2021 | Leabman | |
| 11,271,431 B2 | 3/2022 | Murray et al. | |
| 2007/0084220 A1* | 4/2007 | Asada ................. | B60N 2/5678 62/3.61 |
| 2015/0274068 A1* | 10/2015 | Falconi ................. | B60Q 3/233 297/217.6 |
| 2016/0129819 A1* | 5/2016 | Johnson, Jr. ......... | B60N 2/5891 297/219.1 |
| 2019/0232842 A1* | 8/2019 | Boccuccia ........... | B60N 2/5685 |
| 2021/0162934 A1 | 6/2021 | Tait | |

FOREIGN PATENT DOCUMENTS

| | | | |
|---|---|---|---|
| CN | 210970768 U | 7/2020 | |
| DE | 102019111736 A1 * | 12/2019 | .............. B60N 2/60 |
| JP | 3135705 B2 * | 2/2001 | |

* cited by examiner

*Primary Examiner* — Milton Nelson, Jr.
(74) *Attorney, Agent, or Firm* — Vichit Chea; Price Heneveld LLP

(57) ABSTRACT

A seating system for a vehicle includes a seat component, a seat cover configured to cover at least a portion of the seat component, a connector for connecting the seat cover to the seat component, and an inductive transmitter coil provided on the seat component. The seating system for a vehicle also includes an inductive receiver coil provided on the seat cover and configured to inductively couple to the inductive transmitter coil when the seat cover is connected to the seat component, an electric powered heater provided on the seat cover and configured to receive electrical power from the inductive receiver coil to heat the seat cover, and a shape memory alloy provided on the seat cover and configured to reconfigure the seat cover between a first configuration and a second configuration.

20 Claims, 4 Drawing Sheets

VEHICLE SEATING SYSTEM HAVING INDUCTIVE POWERED COVER

FIELD OF THE DISCLOSURE

The present disclosure generally relates to seating systems, and more particularly relates to a vehicle seating system having a powered seat cover.

BACKGROUND OF THE DISCLOSURE

Motor vehicles are commonly equipped with passenger seats which typically include a seat and a seatback. Both the seat and seatback are typically configured with a padded seat and a fabric or leather cover. In some vehicles, a removable seat cover can be added to cover at least a portion of the seat and/or seatback. It would be desirable to provide a seat cover that provides power such as for heating in an efficient manner.

SUMMARY OF THE DISCLOSURE

According to a first aspect of the present disclosure, a seating system for a vehicle is provided. The seating system includes a seat component, a seat cover configured to cover at least a portion of the seat component, a connector for connecting the seat cover to the seat component, and an inductive transmitter coil provided on the seat component. The seating system also includes an inductive receiver coil provided on the seat cover and configured to inductively couple to the inductive transmitter coil when the seat cover is connected to the seat component, an electric powered heater provided on the seat cover and configured to receive electrical power from the inductive receiver coil to heat the seat cover, and a shape memory alloy provided on the seat cover and configured to reconfigure the seat cover between a first configuration and a second configuration.

Embodiments of the first aspect of the present disclosure can include any one or a combination of the following features:

- the seat component comprises a seat;
- the seat component comprises a seatback;
- the connector is a removable connector that comprises a first magnet located on the seat cover and configured to magnetically attract to a second magnet on the seat component;
- a slot provided in the seat component, wherein the second magnet is located within a slot;
- the electrical heater comprises a resistive heater;
- at least one capacitive sensor for sensing proper position of the seat cover on the seat component;
- a device charging coil located in the seat cover for inductively charging a device;
- a light source provided on the seat cover and powered by the electrical power supplied by the inductive receiver coil;
- a capacitive switch for controlling the electrical heater; and
- the seat component comprises a foam and covering over the foam, wherein the cover layer extends on top of the cover.

According to a second aspect of the present disclosure, a seating system for a vehicle is provided. The seating system including a seat component comprising at least one of a seat and a seat back, a seat cover configured to cover at least a portion of the seat component, a connector for connecting the seat cover to the seat component, an inductive transmitter coil provided on the seat component, and an inductive receiver coil provided on the seat cover and configured to inductively couple to the inductive transmitter coil when the seat cover is connected to the seat component. The seating system also includes an electric powered heater provided on the seat cover and configured to receive electrical power from the inductive receiver coil to heat the seat cover, and a shape memory alloy provided on the seat cover and configured to reconfigure the seat cover between a first configuration and a second configuration, wherein the connector is a removable connector that comprises a first magnet located on the seat cover and configured to magnetically attract to a second magnet in the seat component.

Embodiments of the second aspect of the present disclosure can include any one or a combination of the following features:

- a slot provided in the seat component, wherein the second magnet is located within a slot;
- the electrical heater comprises a resistive heater;
- at least one capacitive sensor for sensing proper position of the seat cover on the seat component;
- a device charging coil located in the seat cover for inductively charging a device;
- a light source provided on the seat cover and powered by the electrical power supplied by the inductive receiver coil;
- a capacitive switch for controlling the electrical heater;
- the seat component comprises a foam and covering over the foam, wherein the cover layer extends on top of the cover; and
- the connector comprises a hook and loop connector removably connecting the seat cover to the covering.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
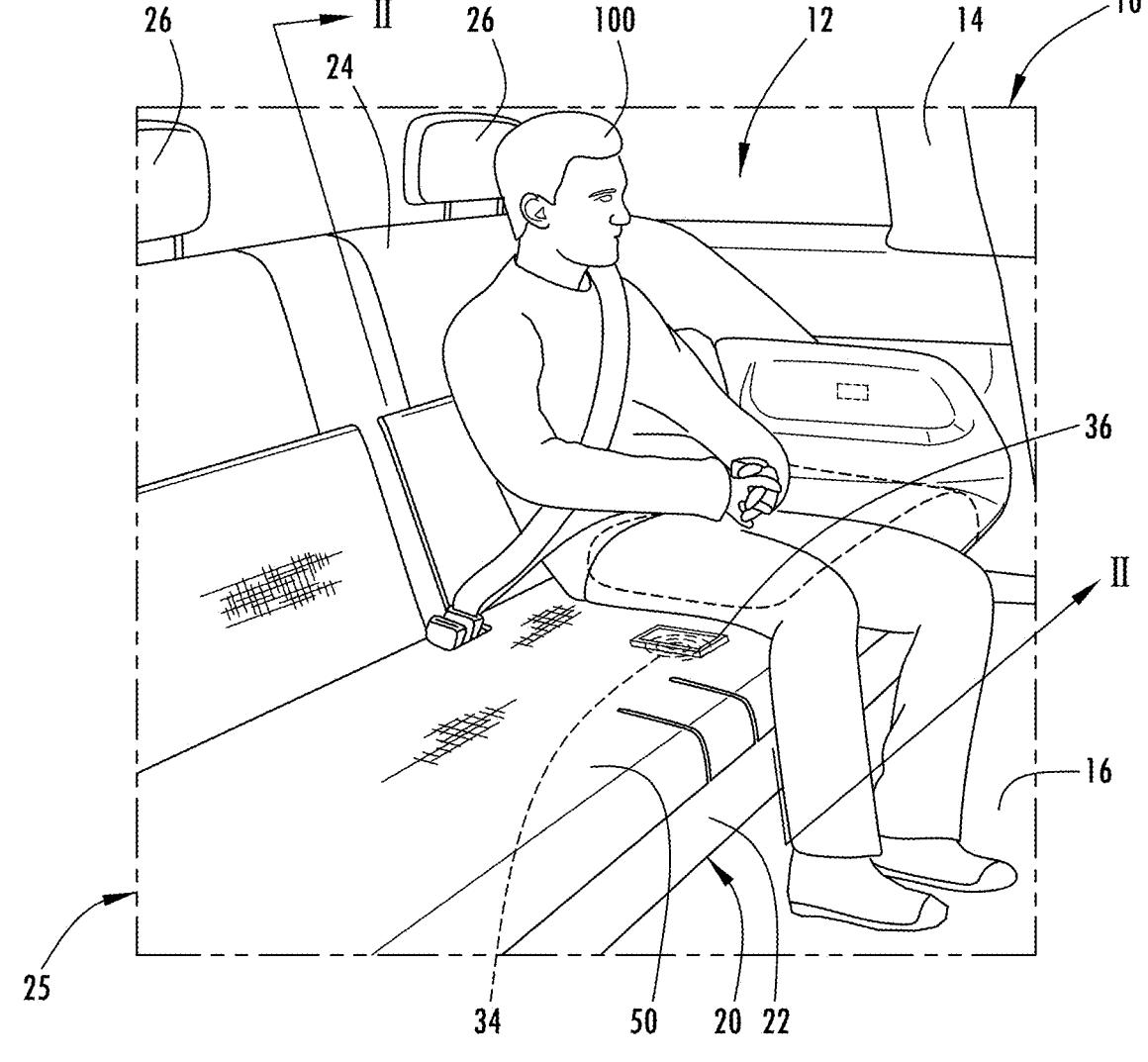
FIG. 1 is a front perspective view of a seating assembly in the cabin interior of a motor vehicle having a passenger and a powered seat cover shown in a first position, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle seating system and vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a motor vehicle 10 is generally illustrated configured with passenger seating for transporting one or more passengers, such as seated passenger 100, in the motor vehicle 10, according to one example. The motor vehicle 10 has a vehicle body that has doors 14 and generally defines a cabin interior 12. The cabin interior 12 may include various features and trim components. The cabin interior 12 is generally shown having a seat assembly 20, such as a rear seat assembly arranged in a second or third row of a passenger vehicle. The seat assembly 20 may include a bench-style seat or may include captains chairs, according to other examples. The cabin interior 12 may include an arrangement of passenger seats including a front row of seating for a driver and one or more passengers and one or more rear rows of seating.

It should be appreciated that the motor vehicle 10 may be a wheeled motor vehicle, such as a car, a truck, an SUV, a van, a bus or other ground vehicle. According to other examples, the motor vehicle 10 may be an aircraft, a boat, or other motor vehicle. The motor vehicle 10 has a motor, such as an internal combustion engine or an electrical motor, or both, according to a few examples.

The seat assembly 20 is shown in FIG. 1 as a bench-style seat assembly having seat components that include a seat base referred to as a seat 22 and a seat back 24. The seat back 24 may pivot or recline into different positions relative to the seat 22 between different incline angles. The seat assembly 20 is generally supported from below on top of an underlying cabin floor 16. In addition, the seat back 24 is shown having a pair of headrests 26 extending upwards at the top end thereof.

Figure 2:
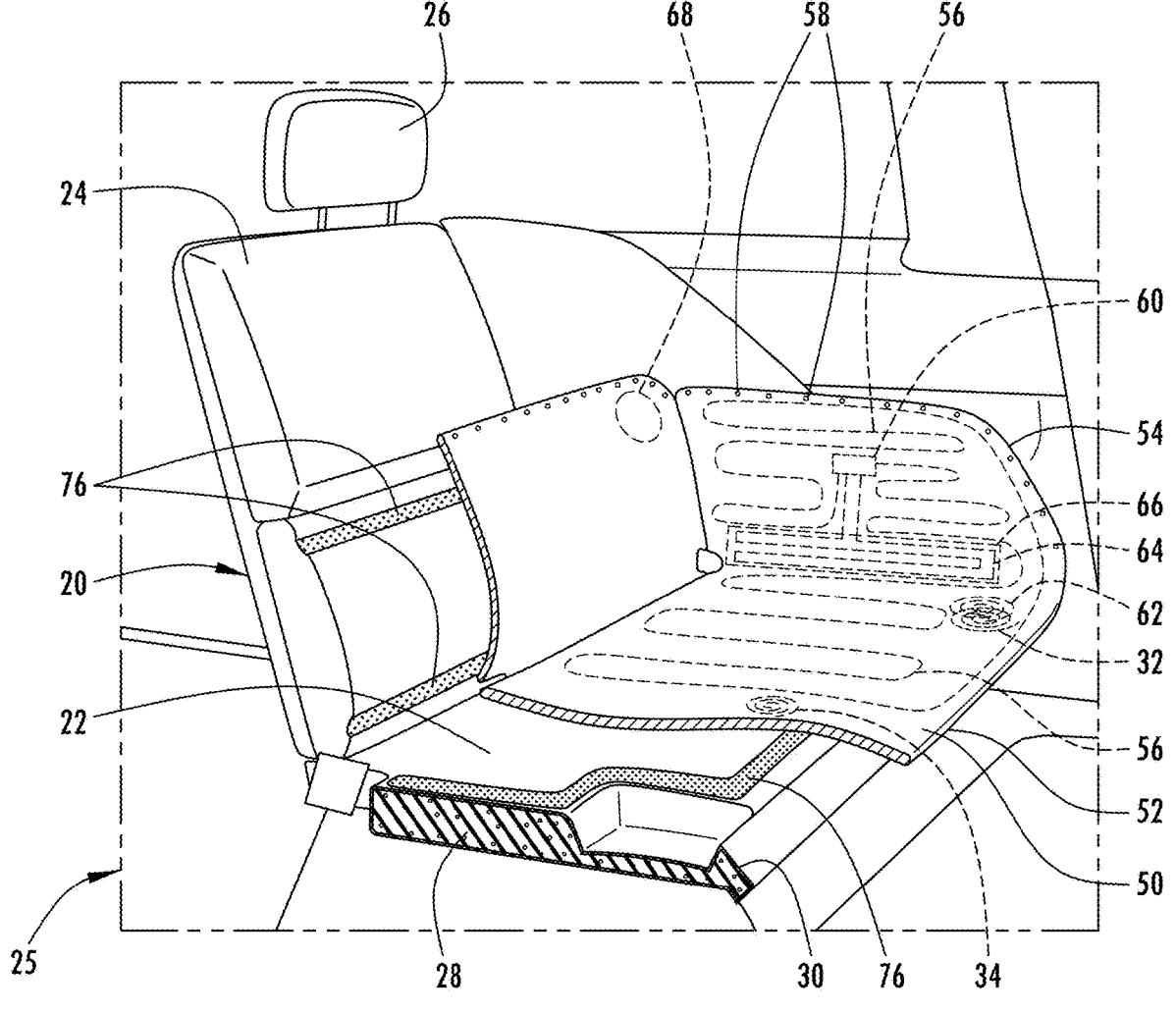
FIG. 2 is a front perspective view of the seating assembly showing the seat cover in a cut-away view in a second position.

The seat assembly 20 is further illustrated in FIG. 2 with the seat 22 shown in a partial cut-away view. The seat 22 may include an underlying support structure such as a frame assembly with a foam pad 28 and an overlying covering 30 which may be made of a fabric or leather, for example. It should be appreciated that the seat back 24 may likewise include an underlying support structure with a frame assembly, a foam pad and a covering layer.

The seat assembly 20 shown in FIGS. 1 and 2 is part of a seat system 25 for the motor vehicle 10. The seat system 25 generally includes a seat component which may include the seat 22 and/or the seat back 24. The seat system 25 also includes a seat cover 50 configured to cover at least a portion of the seat component(s) shown as the seat 22 and a portion of the seat back 24, according to one example. The seat cover 50 may be removably connected onto the seat assembly with connectors such as magnets and/or hook and loop connectors 76 such as Velcro®. The seat 22 is configured to inductively receive electric power to power one or more devices associated with the seat cover 50. The seat 22 includes an inductive transmitter coil 32 provided in or close to a surface of the seat 22 and configured to matingly align with and inductively couple with an inductive receiver coil 62 provided in the seat cover 50. In addition, the seat cover 50 has a device charger inductive transmitter coil 34 provided at a location configured to inductively couple with an inductive receiver coil provided in a portable device, such as a phone 36. It should be appreciated that the inductive transmitter coil 32 receives electrical power from a power supply, such as one or more batteries in the motor vehicle 10. The electrical power may be an alternating current (AC) that is converted from a direct current (DC) to AC with an inverter and supplied to the inductive transmitter coil 32. The AC power in the inductive transmitter coil 32 generates a magnetic field which induces a voltage in the inductive receiver coil 62. The device charger transmitter inductive coil 34 receives the electrical power via the inductive receiver coil 62.

The seat cover 50 is configured having a substantially horizontal base portion 52 that extends into a side wall portion 54 at a lateral side. Side wall portion 54 may flex and bend between an upright position shown in FIG. 2 and a folded position in FIG. 1 which overlaps the passenger 100 shown seated on the seat assembly 20 and seat cover 50. Movement of the side wall portion 54 between the upright and folded positions is controlled by an actuator configured as a shape memory alloy (SMA) 66. It should be appreciated that the seat cover 50 may have side end portions on each of the appropriate lateral sides of the horizontal base portion 52.

The seat cover 50 includes one or more electrically powered resistive heaters 56 which may be resistive heating elements extending throughout one or more areas of the seat cover 50. The resistive heaters 56 are operatively coupled to the inductive receiver coil 62 and may be controlled to be activated and inactivated via a control module 60 and user input. Electric power transmitted via the inductive transmitter coil 32 is inductively received through the inductive receiver coil 62 and supplied to power the electric resistive heaters 56 to generate thermal energy to heat the seat cover 50.

In addition, electric power received via induction at the inductive receiver coil 62 is supplied to an SMA heater 64 which is shown positioned at a location extending between the base portion 52 and the side wall portion 54 of the seat cover 50. The SMA heater 64 receives electric power from the inductive receiver coil 62 and generates thermal energy to heat the SMA 66 which causes the SMA 66 to change shape to force the upstanding side wall 54 to reconfigure from the first configuration in the upstanding position shown in FIG. 2 to a second configuration in the folded position shown in FIG. 1. The SMA heater 64 may be activated or deactivated via the control module 60 and a user input. Upon thermal cooling of the SMA 66, the upstanding side wall 54 will move from the folded position back to the extended position.

In addition, the seat cover 50 is shown having a plurality of lighting devices 58 shown in one example arranged along the peripheral edge of the seat cover 50. The lighting devices 58 may include one or more light-emitting diodes (LEDs), for example. The lighting devices 58 may receive electric power from the inductive receiver coil 62 and may be controlled via the control module 60 and a user input. It should be appreciated that an input sensor may be employed to activate electrically powered devices including the lighting devices 58. Further, an audio speaker 68 is shown located in the seat cover 50. The audio speaker 68 may be a wireless audio speaker that receives electric power from the inductive receiver coil 62 and broadcasts audible sound that may be received via wireless communication, such as via Bluetooth®, for example.

Figure 3:
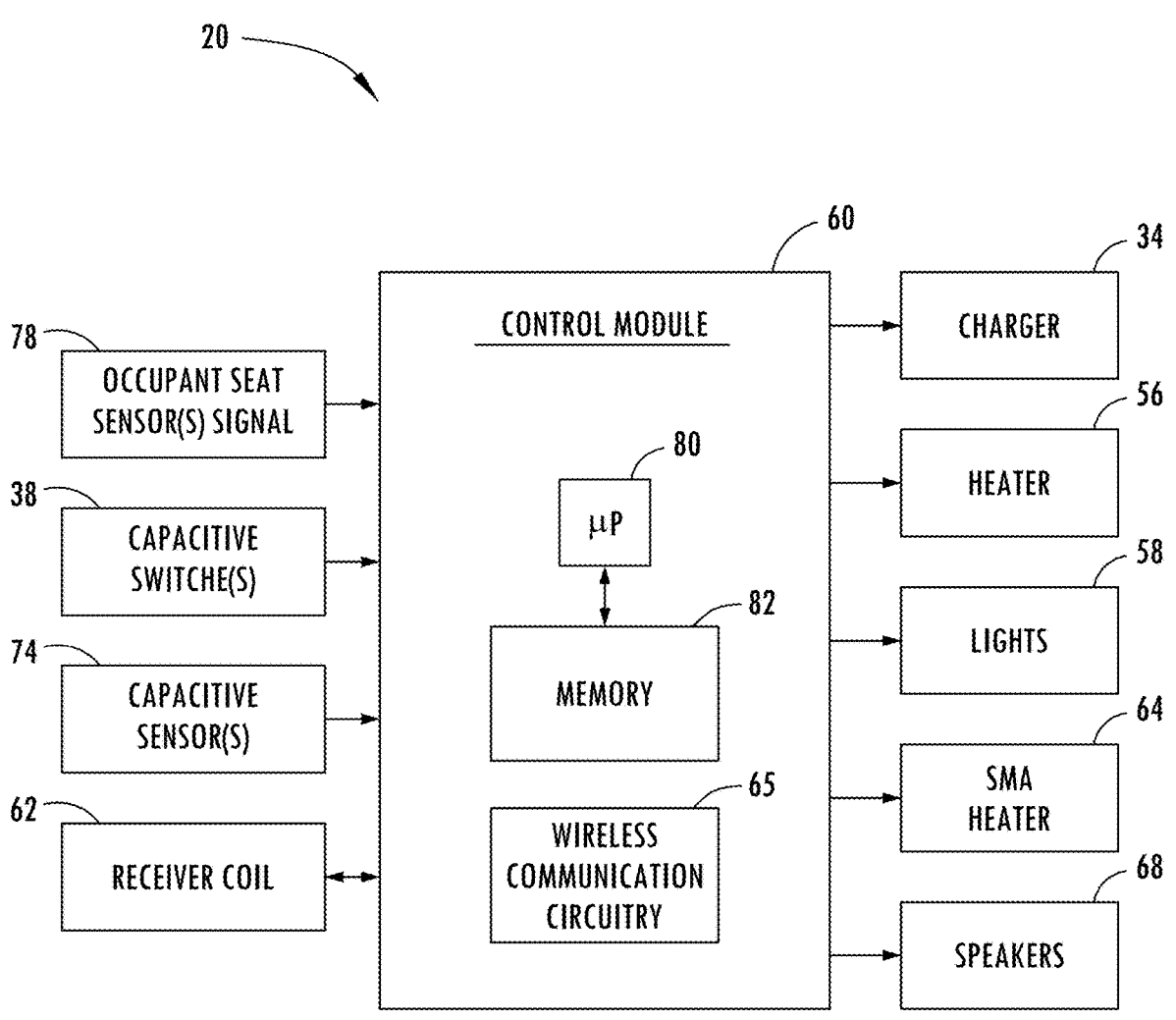
FIG. 3 is a block diagram of the seating assembly showing the controls and controlled features.

Referring to FIG. 3, the control module 60 is shown having control circuitry configured as a microprocessor 80 and memory 82. It should be appreciated that the control module 60 may include other analog and/or digital control circuitry. Memory 82 may include one or more routines for controlling the various devices associated with the seat cover 50. The control module may also include wireless communication circuitry 65, such as Bluetooth®, for example BLE. The control module 60 receives signals from one or more occupant seat sensor signals 78, the capacitive switches 38, and the capacitive sensor 74, and receives electric power from the inductive receiver coil 62. The occupant seat sensor signals 78 may be generated by seat weight sensors, seatbelt sensors, camera detectors or other occupant detections. The control module 60 processes the received signals and generates outputs that are supplied to the device charger inductive transmitter coil 34, light devices 58, resistive heaters 56, speaker 68 and the SMA heater 64. The control module 60 may use the wireless communication circuitry 65 to communicate data and communication signals with the various devices.

Figure 4:
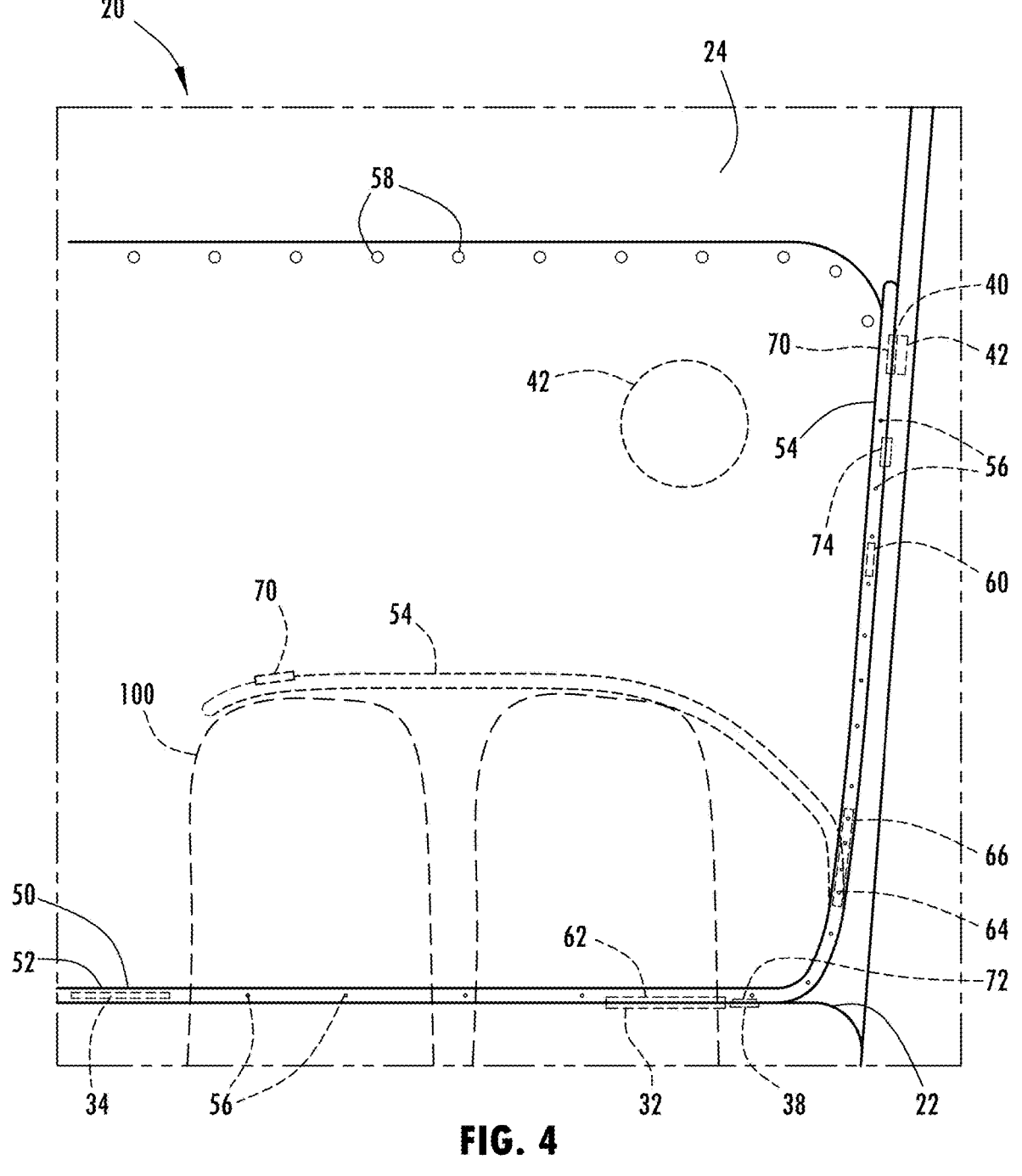
FIG. 4 is a cross-sectional view taken through line IV-IV of FIG. 1.

Referring to FIG. 4, the seat cover 50 is further illustrated showing the inductive receiver coil 62 in the seat cover 50 aligned above and in close proximity to the inductive transmitter coil 32 in the seat 22. In addition, the capacitive switch 38 is shown positioned proximate to a metallic shorting tape 72 which is a conductive tape on the bottom side of the cover that is sensed by the capacitive switch 38 to detect proper alignment of the seat cover 50 relative to the underlying seat 22. When the metallic shorting tape 72 is positioned proximate to the capacitive switch 38, an alignment is detected, indicating proper alignment of the seat cover 50 on the seat 22.

The side wall portion 54 of the seat cover 50 is shown having a seat body panel magnet 42 disposed within a slot 40 in a lateral side wall of the seat assembly 20. In addition, a seat cover magnet 70 is provided in the side wall portion 54 of the seat cover 50. The seat cover magnet 70 is configured to be aligned with the seat body panel magnet 42 when the seat cover 50 is properly aligned on the seat assembly 20 and the side wall portion 54 is in the upstanding position and magnetically attracted to the seat body panel magnet 42. It should be appreciated that the seat cover magnet 70 may extend further within the slot 40 formed in the seat assembly to ensure proper alignment of the seat cover 50 on the seat 22. The magnets 42 and 70 hold the seat cover 50 in place on the seat assembly 20 and are forced apart by the SMA 66 when thermally heated to allow the seat cover 50 to reconfigure into the folded position.

Accordingly, the seat system 25 advantageously provides for a seat cover 50 that may be removably assembled onto and removed from a seat component, such as a seat 22 of a seat assembly 20 in a motor vehicle 10. The seat cover 50 advantageously is powered by electric power transmitted via inductive coils to provide thermal heating to one or more seated occupants. In addition, the seat cover 50 advantageously provides electric power for light illumination, charging and other powered accessories made available to passengers in the motor vehicle 10. The seat cover 50 may advantageously move between a folded position and an extended upright position to provide added comfort for seated passengers.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A seating system for a vehicle, the seating system comprising:
   a seat component;
   a seat cover configured to cover at least a portion of the seat component;
   a connector for connecting the seat cover to the seat component;
   an inductive transmitter coil provided on the seat component;
   an inductive receiver coil provided on the seat cover and configured to inductively couple to the inductive transmitter coil when the seat cover is connected to the seat component;
   an electric powered heater provided on the seat cover and configured to receive electrical power from the inductive receiver coil to heat the seat cover; and
   a shape memory alloy provided on the seat cover and configured to reconfigure the seat cover between a first configuration and a second configuration.

2. The seating system of claim 1, wherein the seat component comprises a seat.

3. The seating system of claim 1, wherein the seat component comprises a seatback.

4. The seating system of claim 1, wherein the connector is a removable connector that comprises a first magnet located on the seat cover and configured to magnetically attract to a second magnet on the seat component.

5. The seating system of claim 4 further comprising a slot provided in the seat component, wherein the second magnet is located within the slot.

6. The seating system of claim 1, wherein the electrical heater comprises a resistive heater.

7. The seating system of claim 1 further comprising at least one capacitive sensor for sensing proper position of the seat cover on the seat component.

8. The seating system of claim 1 further comprising a device charging coil located in the seat cover for inductively charging a device.

9. The seating system of claim 1 further comprising a light source provided on the seat cover and powered by the electrical power supplied by the inductive receiver coil.

10. The seating system of claim 1 further comprising a capacitive switch for controlling the electrical heater.

11. The seating system of claim 1, wherein the seat component comprises a foam and covering over the foam, wherein the seat cover extends on top of the covering.

12. A seating system for a vehicle, the seating system comprising:
   a seat component comprising at least one of a seat and a seat back;
   a seat cover configured to cover at least a portion of the seat component;
   a connector for connecting the seat cover to the seat component;
   an inductive transmitter coil provided on the seat component;
   an inductive receiver coil provided on the seat cover and configured to inductively couple to the inductive transmitter coil when the seat cover is connected to the seat component;
   an electric powered heater provided on the seat cover and configured to receive electrical power from the inductive receiver coil to heat the seat cover; and
   a shape memory alloy provided on the seat cover and configured to reconfigure the seat cover between a first configuration and a second configuration, wherein the connector is a removable connector that comprises a first magnet located on the seat cover and configured to magnetically attract to a second magnet in the seat component.

13. The seating system of claim 12 further comprising a slot provided in the seat component, wherein the second magnet is located within the slot.

14. The seating system of claim 12, wherein the electrical heater comprises a resistive heater.

15. The seating system of claim 12 further comprising at least one capacitive sensor for sensing proper position of the seat cover on the seat component.

16. The seating system of claim 12 further comprising a device charging coil located in the seat cover for inductively charging a device.

17. The seating system of claim 12 further comprising a light source provided on the seat cover and powered by the electrical power supplied by the inductive receiver coil.

18. The seating system of claim 12 further comprising a capacitive switch for controlling the electrical heater.

19. The seating system of claim 12, wherein the seat component comprises a foam and covering over the foam, wherein the seat cover extends on top of the covering.

20. The seating system of claim 12, wherein the connector comprises a hook and loop connector removably connecting the seat cover to the seat component.

* * * * *